United States Patent
Shi et al.

(10) Patent No.: US 7,920,839 B2
(45) Date of Patent: Apr. 5, 2011

(54) SYSTEM AND METHOD FOR STATION DETECTION AND SEEK IN A RADIO RECEIVER

(75) Inventors: Ying Shi, Coralville, IA (US); James P. Young, Cedar Rapids, IA (US); Gary L. Rohret, Swisher, IA (US); Russell W. DeHoedt, Cedar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 609 days.

(21) Appl. No.: 12/025,067

(22) Filed: Feb. 4, 2008

(65) Prior Publication Data

US 2009/0197554 A1    Aug. 6, 2009

(51) Int. Cl.
*H04B 17/00* (2006.01)
(52) U.S. Cl. ......... 455/226.2; 455/63.2; 455/161.3; 455/224; 455/226.3
(58) Field of Classification Search ........ 455/226.2, 455/63.2, 161.3, 224, 226.3, 226.1, 130, 455/513, 67.11, 150.1, 160.1, 161.1–162.1, 455/176.1, 166.2, 184.1, 225, 230
See application file for complete search history.

(56) References Cited

U.S. PATENT DOCUMENTS

| | | | |
|---|---|---|---|
| 5,148,548 A | 9/1992 | Meche et al. | |
| 5,339,455 A | 8/1994 | Vogt et al. | |
| 6,047,171 A * | 4/2000 | Khayrallah et al. | 455/266 |
| 6,374,094 B1 * | 4/2002 | Zappala | 455/188.1 |
| 7,103,316 B1 * | 9/2006 | Hall | 455/63.1 |
| 7,162,271 B2 * | 1/2007 | Kermalli | 455/561 |
| 7,539,470 B2 * | 5/2009 | Kim et al. | 455/130 |
| 7,804,922 B2 * | 9/2010 | Shi et al. | 375/350 |
| 2004/0233886 A1 * | 11/2004 | Dieterich et al. | 370/348 |
| 2005/0265498 A1 * | 12/2005 | Gunzelmann et al. | 375/350 |
| 2008/0292036 A1 * | 11/2008 | Wilhelmsson et al. | 375/348 |
| 2008/0299932 A1 * | 12/2008 | Belogolovy et al. | 455/296 |
| 2008/0311860 A1 * | 12/2008 | Tanaka et al. | 455/73 |
| 2009/0135973 A1 * | 5/2009 | He | 375/350 |

FOREIGN PATENT DOCUMENTS

| | | |
|---|---|---|
| JP | 2004-056500 | 2/2004 |
| JP | 2006-165677 | 6/2006 |

* cited by examiner

*Primary Examiner* — Pablo N Tran
(74) *Attorney, Agent, or Firm* — Michael J. Tempel; Smith Frohwein Tempel Greenlee Blaha LLC

(57) ABSTRACT

A system for detecting a broadcast channel in a radio receiver includes a receive signal strength indicator (RSSI) element configured to develop an RSSI signal that is representative of a power in a desired channel, a switchable bandwidth channel select filter having a power detector configured to compare a power output of the desired channel and at least one channel adjacent to the desired channel to develop a signal to adjacent channel power ratio (SACPR) signal that is representative of the noise in the desired channel, and a seek element configured to determine whether the RSSI signal is greater than a predetermined RSSI threshold and configured to determine whether the SACPR signal is greater than a predetermined SACPR threshold.

15 Claims, 9 Drawing Sheets

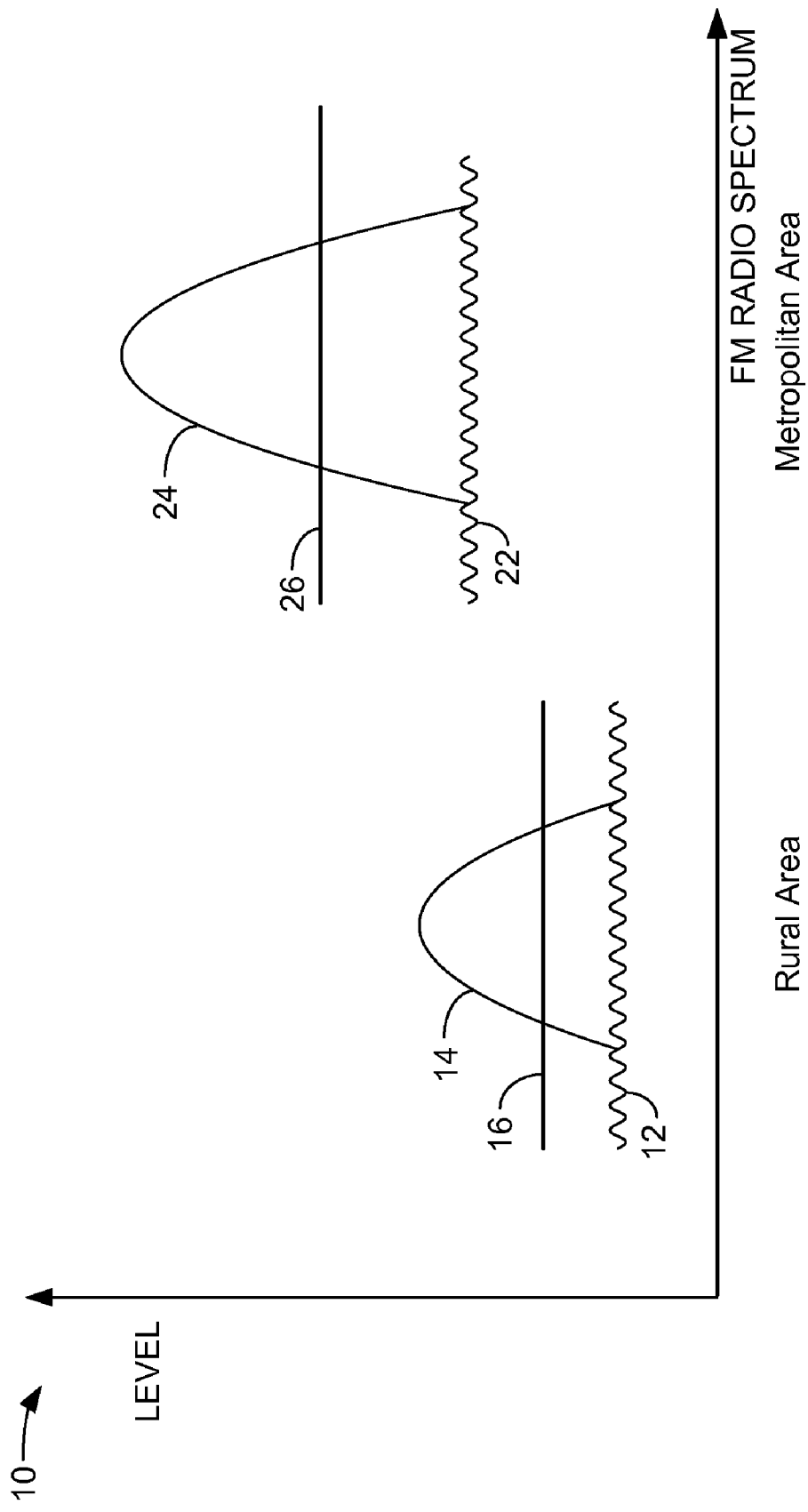

SYSTEM AND METHOD FOR STATION DETECTION AND SEEK IN A RADIO RECEIVER

CROSS-REFERENCE TO RELATED APPLICATION

This application is related to U.S. patent application Ser. No. 11/681,211 entitled "System And Method For Adjacent Channel Power Detection And Dynamic Bandwidth Filter Control, filed on Mar. 2, 2007, which is hereby incorporated in its entirety into this document by reference.

BACKGROUND

Portable communication devices, such as cellular telephones, personal digital assistants (PDAs) and other communication devices often include multiple radio receivers or transceivers. For example, a cellular telephone may include a cellular transceiver, a television receiver and an FM radio. One of the features included in many FM radio receivers is a function referred to as a "seek" function. The seek function enables the radio to automatically and autonomously search for valid channels (i.e., channels where station broadcast exists). One important aspect of implementing a robust seek function is to have the ability to reliably detect a valid channel.

A valid channel is a channel in which a broadcasting station exists within reception range of the radio receiver, even if the broadcast signal in the channel is very weak. An invalid channel is a channel in which there is no station broadcast. The goal of a seek function is to skip invalid channels and lock on to detected valid channels.

Complicating the design of a robust seek function is that the same radio should work in very different broadcast environments. For example, the same radio design should work in rural areas where signals are weak and the noise floor is low, and in large metropolitan areas where signals are strong, the noise floor is high and where many signals coexist.

One manner of determining whether a station is valid is the detection and measurement of what is referred to as a received signal strength indictor (RSSI). The RSSI signal is a parameter measured at the receiver and is an indicator of the signal strength in the desired, or target, channel. When the RSSI signal is higher than a certain threshold, it often implies the existence of a valid channel, or station, and vice versa.

Unfortunately, there are challenges related to using the RSSI signal as the only criteria to determine whether a valid station is broadcasting in the area of the radio. First, the optimal value of the RSSI threshold varies in different environments. In rural areas, where both the signal strength and the noise floor are low, a small value for the threshold is required. In metropolitan (metro) areas, where both the signal strength and the noise floor are higher than in a rural area, a higher threshold value is more optimal. Unfortunately, the threshold value is not typically user-adjustable. This threshold is predetermined and preset by the radio manufacturer. If the threshold is set too high, the radio may erroneously skip weak, but valid channels during the seek operation. On the other hand, if the threshold is set too low, the radio may erroneously lock on an invalid channel, where the noise energy is higher than the threshold. As a result, trade-offs are typically made in selecting the RSSI threshold value, which compromises the robustness of the seek function.

Another challenge related to using the RSSI signal as the only criteria to determine whether a valid station is broadcasting in the area of the radio is due to the energy spillover from a strong adjacent channel. As a result, the desired channel may contain a significant amount of energy spillover from its adjacent channels and pass the RSSI threshold test, even through there is no station broadcast in the desired channel.

Therefore, it would be desirable to have a robust seek function for a radio receiver that works in a variety of broadcast environments.

SUMMARY

Embodiments of the invention include a system for detecting a broadcast channel in a radio receiver including a receive signal strength indicator (RSSI) element configured to develop an RSSI signal that is representative of a power in a desired channel, a switchable bandwidth channel select filter having a power detector configured to compare a power output of the desired channel and at least one channel adjacent to the desired channel to develop a signal to adjacent channel power ratio (SACPR) signal that is representative of the noise in the desired channel, and a seek element configured to determine whether the RSSI signal is greater than a predetermined RSSI threshold and configured to determine whether the SACPR signal is greater than a predetermined SACPR threshold.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 1A is a schematic diagram illustrating a relationship between receive signal strength indication (RSSI) and noise floor for a portion of a radio spectrum.

DETAILED DESCRIPTION

Figure 1B:
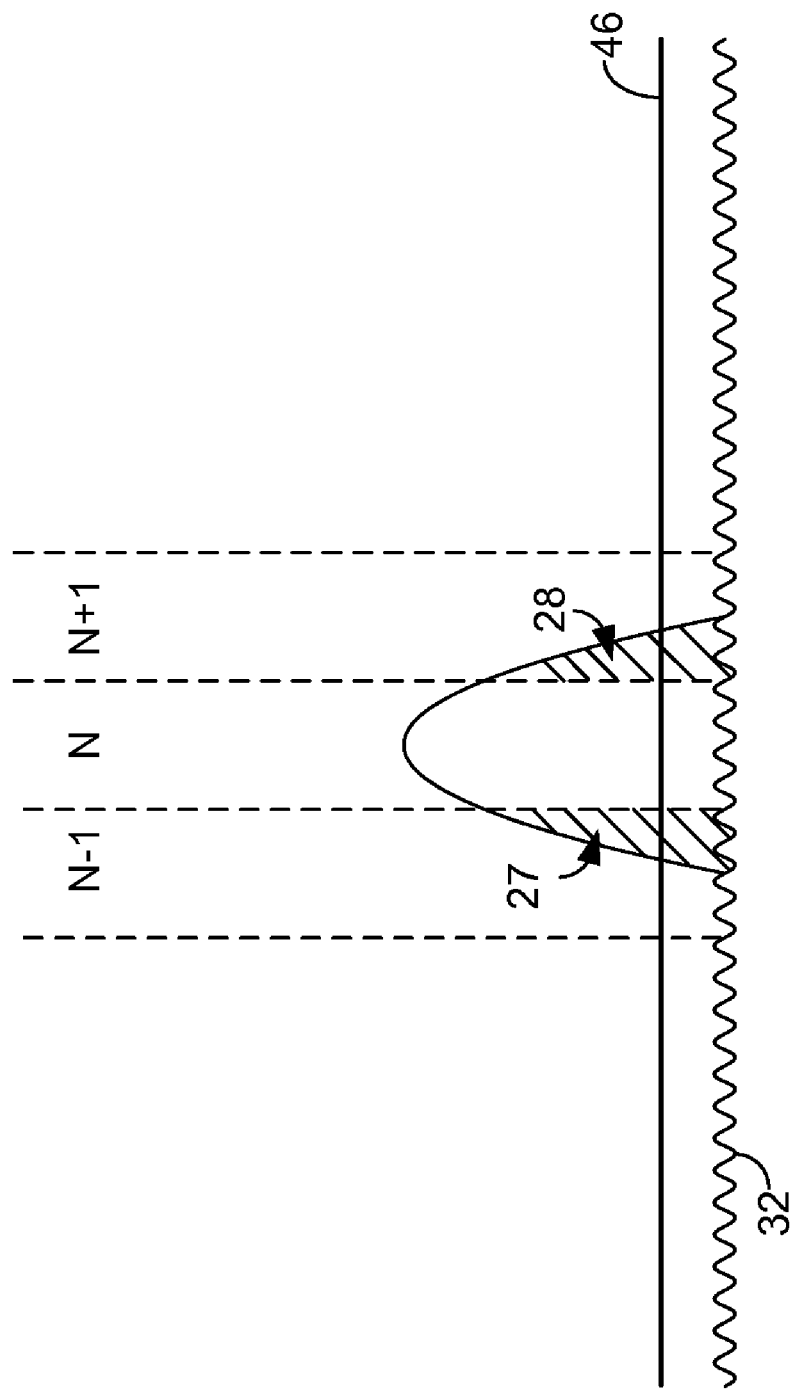
FIG. 1B is a schematic diagram illustrating a situation in which invalid channels N−1 and N+1 are adjacent to a valid channel N.

Although described with particular reference to a portable transceiver incorporating an FM radio receiver, the system and method for station detection and seek in a radio receiver can be implemented in any receiver in which it is desirable to automatically detect and lock on to a particular radio frequency (RF) carrier signal, associated with a desired radio station.

The system and method for station detection and seek in a radio receiver uses multiple criteria for detecting a valid channel. A first criteria includes using an RSSI signal as an indicator of the presence of a valid channel. A second criteria includes using the ratio of power in the desired channel to the power in the adjacent channels as another indicator of the presence of a valid channel. The ratio of power in the desired channel to the power in the adjacent channels is referred to as signal to adjacent channel power ratio (SACPR). The desired channel is indicated when the SACPR exceeds a certain threshold. Additionally, this solution provides a simple method to measure the SACPR. In this method, a channel select filter is structured in such a way that it not only provides superior selectivity and dynamic bandwidth control, but also readily measures the power ratio. The system and method for station detection and seek in a radio receiver is fully integrated into a radio receiver and does not use additional circuit area. Further, the system and method for station detection and seek in a radio receiver is particularly well suited for digital filter implementation.

Further, the system and method for station detection and seek in a radio receiver adds no delay to the received signal. The RSSI measurement and the power ratio measurement can occur simultaneously. As a result, minimal seek time can be achieved, which is an important requirement for an FM radio.

The system and method for station detection and seek in a radio receiver can be implemented in hardware, software, or a combination of hardware and software. When implemented in hardware, the system and method for station detection and seek in a radio receiver can be implemented using specialized hardware elements and logic. When the system and method for station detection and seek in a radio receiver is implemented partially in software, the software portion can be used to precisely control the various components in an RSSI detection circuit and in a channel filter associated with a receiver. The software can be stored in a memory and executed by a suitable instruction execution system (microprocessor). The hardware implementation of the system and method for station detection and seek in a radio receiver can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for station detection and seek in a radio receiver comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1A is a schematic diagram illustrating a relationship between receive signal strength indication (RSSI) and noise floor for a portion of a radio spectrum. In a rural area having a relatively low density of broadcast stations and in which the FM receiver is distant from the broadcast towers, the noise floor 12 is relatively low as is the desired signal 14. In such an application, the RSSI threshold, 16, can be set relatively low. However, if the radio is operating in a large metropolitan (metro) area having many broadcast stations, the noise floor 22 is relatively high, as is the desired signal 24. In such an application, the RSSI threshold, 26, must be set relatively high. Indeed, the noise floor 22 in a large metro area may be higher than the desired signal 14 in a rural area. As shown by the two situations shown in FIG. 1A, the same radio receiver would have difficulty performing a robust and accurate seek function in both environments.

FIG. 1B is a schematic diagram illustrating a situation in which invalid channels N−1 and N+1 are adjacent to a valid channel N. The noise floor is illustrated at 32. The "skirt" of signal power in the valid channel, N, can extend into its adjacent channels N−1 and N+1. This is known as spectral spillover, or energy or power spillover. The power spillover is shown as regions 27 and 28 in FIG. 1B. The power spillover in regions 27 and 28 can contain sufficient energy to potentially exceed the RSSI threshold, 46, and cause a radio receiver to erroneously lock onto channel N−1 and/or N+1, even though they are invalid channels having no broadcast station present.

The challenges of detecting a valid broadcast channel, as illustrated in FIGS. 1A and 1B, can be addressed by using a combination of RSSI and SACPR as criteria for valid channel detection. Using the combination of RSSI and SACPR improves the robustness of channel detection and seek in a radio receiver. The solution will be described in detail below.

In an embodiment, the amount of noise in a channel adjacent to the desired signal band can be used to reliably estimate an amount of noise in the desired signal band. The combination of the RSSI signal and the amount of noise in an adjacent channel can be used to reliably determine the presence of a desired signal when implementing a seek function in a radio receiver.

Figure 2:
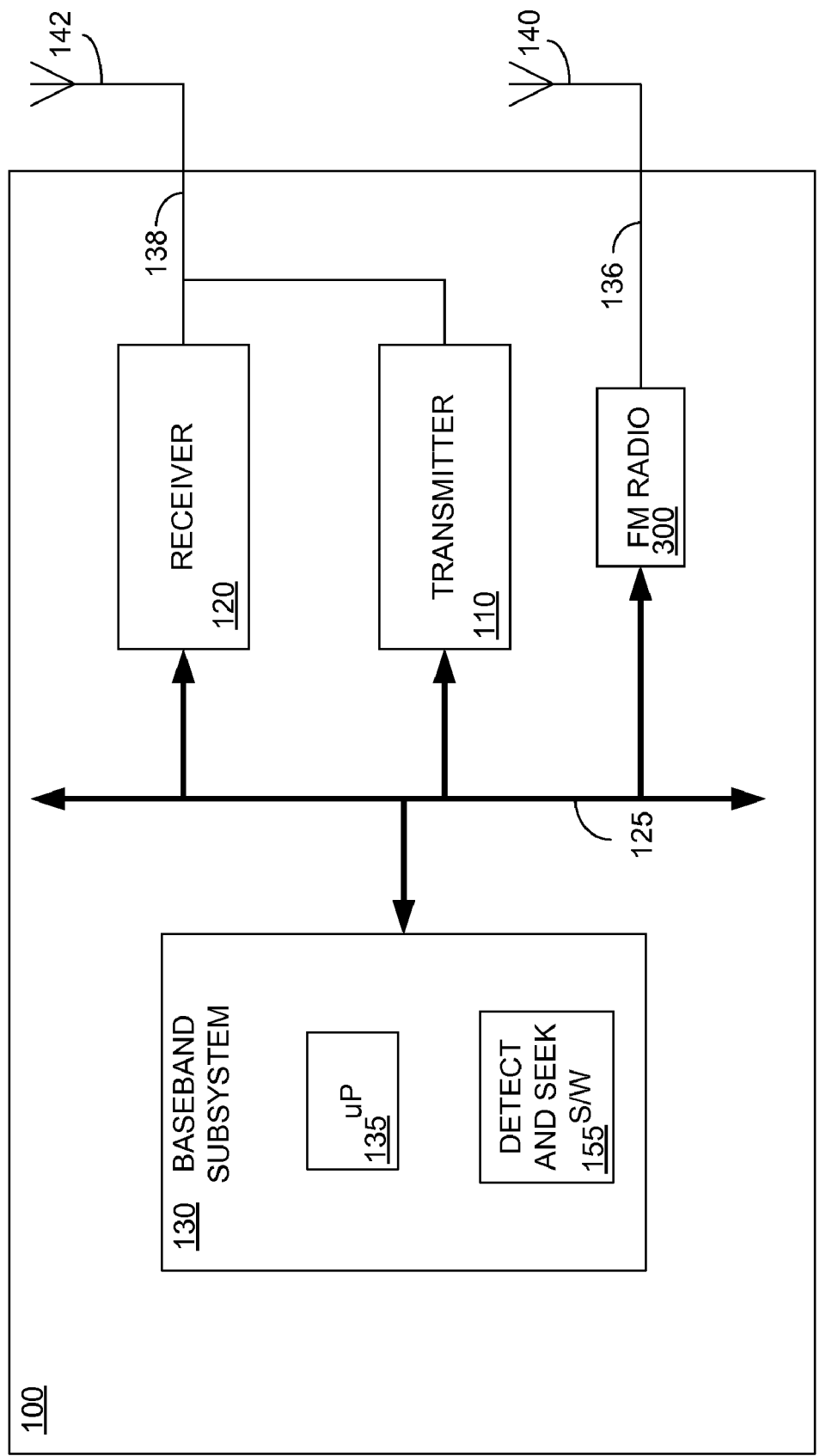
FIG. 2 is a block diagram illustrating a simplified portable transceiver.

FIG. 2 is a block diagram illustrating a simplified portable transceiver 100. Embodiments of the system and method for station detection and seek in a radio receiver can be implemented in any radio receiver, and are typically implemented in an FM radio receiver. The portable transceiver 100 illustrated in FIG. 2 is intended to be a simplified example and to illustrate one of many possible applications in which the system and method for station detection and seek in a radio receiver can be implemented. One having ordinary skill in the art will understand the operation of a portable transceiver. The portable transceiver 100 includes a transmitter 110, a receiver 120, and a baseband module 130 connected over a communication bus 125. The portable transceiver 100 also includes an FM radio receiver 300. The receiver 120 and transmitter 110 are connected to antenna 142 over connection 138. The FM radio receiver 300 is connected to an antenna 140 over connection 136 so that the FM radio receiver 300 may receive broadcast radio signals. If portions of the system and method for station detection and seek in a radio receiver are implemented in software, then the baseband module 130 also includes detection and seek software 155 that can be executed by a microprocessor 135, or by another processor to control the operation of the system and method for station detection and seek to be described below.

Figure 3:
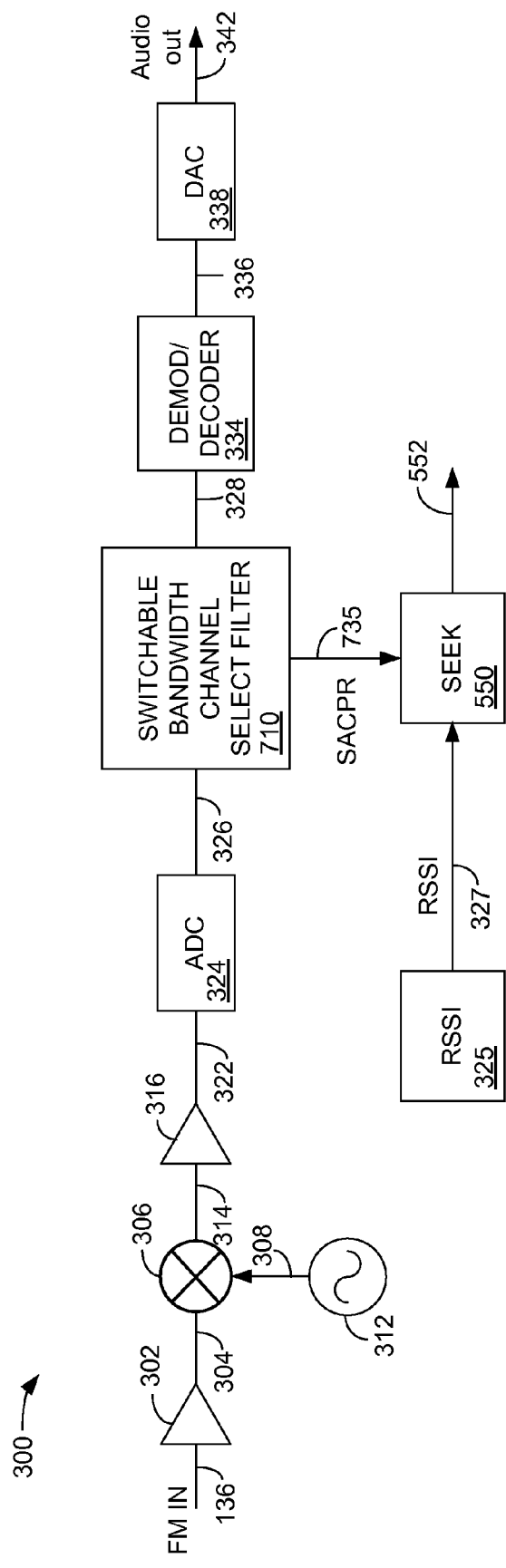
FIG. 3 is a simplified schematic diagram illustrating an embodiment of an FM radio in which the system and method for station detection and seek in a radio receiver can be implemented.

FIG. 3 is a simplified schematic diagram illustrating an embodiment of the FM radio 300 shown in FIG. 2 in which the system and method for station detection and seek in a radio receiver can be implemented. Only the portions of an FM radio that are relevant to the explanation of the system and method for station detection and seek are shown. The block diagram shown in FIG. 3 is a generic, simplified version of an FM radio. The actual implementation of the radio can be more complicated and can comprise functional blocks in addition to the functional blocks shown in FIG. 3. The FM radio architecture can also differ from that shown in FIG. 3. The signals shown in FIG. 3 can also be either real signals or complex signals. In the case of complex signals, the signal paths can include an in-phase (I) path and a quadrature-phase (Q) path. Accordingly, the system and method for station detection and seek in a radio receiver, to be described below, can employ either a real filter, a complex filter, or a combination of real and complex filters. In all cases, the system and method for station detection and seek is applicable regardless of the actual architecture and the types of signals. The FM radio 300 includes a low noise amplifier (LNA) 302, which receives an FM radio input signal from the antenna 140 (FIG. 2) via connection 136. The output of the LNA 302 on connection 304 is supplied to a mixer 306. The mixer 306 receives a reference signal, also referred to as a local oscillator (LO) signal, via connection 308. The LO signal is supplied by an oscillator 312. The frequency of the LO signal on connection 308 determines the intermediate frequency to which the mixer 306 converts the signal on connection 304.

The output of the mixer 306 on connection 314 is an intermediate frequency (IF) signal and is supplied to an IF amplifier 316. The IF amplifier may be implemented as a series of IF amplifiers and is shown as a single amplifier for simplicity. The IF amplifier 316 amplifies the signal on connection 314 and supplies the amplified IF signal on connection 322. The gain of the IF amplifier 316 is controlled by an automatic-gain-control (AGC) circuit (not shown). The amplified IF signal on connection 322 is supplied to an analog to digital converter (ADC) 324.

The ADC 324 converts the analog IF signal on connection 322 to a digital signal on connection 326. The digital IF signal on connection 326 is then supplied to a switchable bandwidth channel select filter 710. The switchable bandwidth channel select filter 710 provides sufficient selectivity by removing substantially all of the power in channels other than the power in the desired channel. The structure and operation of the switchable bandwidth channel select filter 710 will be described in greater detail below. The switchable bandwidth channel select filter 710 also generates the SACPR signal 735 that is used for station detection and seek, as will be described below.

The output of the switchable bandwidth channel select filter 710 is supplied via connection 328 to a demodulator/decoder 334. The demodulator/decoder 334 extracts the baseband information from the IF signal output of the switchable bandwidth channel select filter 710 and supplies its output via connection 336. The signal on connection 336 is supplied to a digital to analog converter (DAC) 338. The DAC 338 converts the digital signal on connection 336 to an analog audio signal and provides the analog audio signal as an audio output on connection 342. The audio output on connection 342 is then supplied to appropriate processing elements within the portable transceiver 100, so that FM radio can be provided to a user.

The RSSI element 325 generates an RSSI signal 327 that is indicative of the strength of the received signal at the LNA input, 136. The switchable bandwidth channel select filter 710 removes substantially all of the energy from all channels except the desired channel. As a result, the signal at connection 328 includes only the desired signal. Thus, the RSSI signal can be calculated as the measured signal strength at connection 328 divided by the total gain from connection 136 to connection 328. Those skilled in the art are familiar with the calculation of an RSSI signal.

The RSSI signal on connection 327 and the SACPR signal on connection 735 are supplied to the seek element 550. The seek element 550 performs valid channel detection using two criteria. The first criteria includes using the RSSI signal as an indicator of the presence of a valid station. The RSSI signal should exceed a predetermined threshold, referred to as $\gamma\_rssi$, for a channel to be valid. The second criteria includes using the SACPR as another indicator of the presence of a valid channel. The SACPR signal should exceed a predetermined threshold, referred to as $\gamma\_sacpr$, for a channel to be considered valid. A station is present in the desired channel when both the RSSI signal and the SACPR exceed their respective thresholds.

Figure 4:
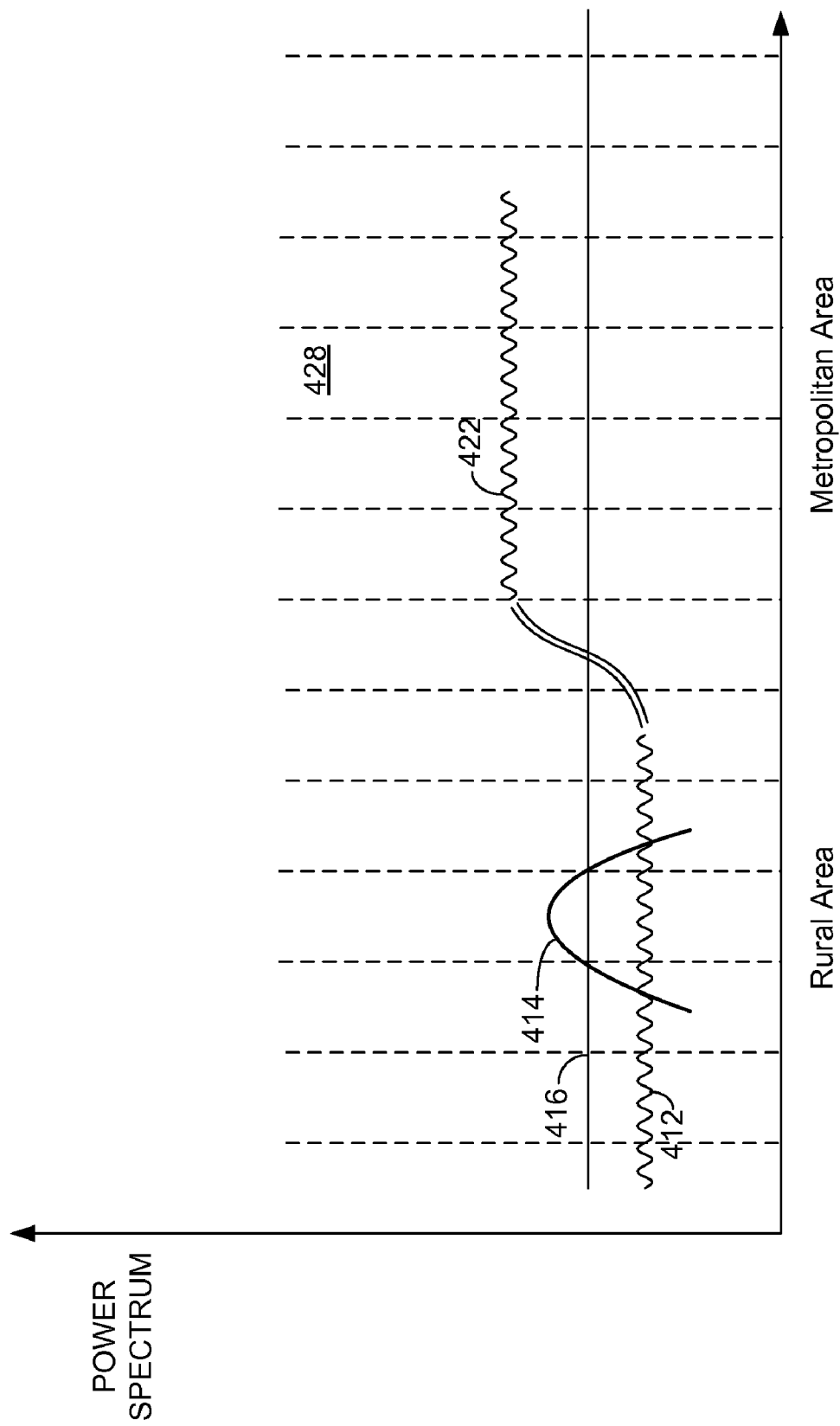
FIG. 4 is a graphical illustration showing how the problem described in FIG. 1A can be solved by using a combination of the RSSI test and the SACPR test.

FIG. 4 is a graphical illustration showing how the situation described in FIG. 1A can be addressed by using a combination of the RSSI test and the SACPR test for valid channel detection. In a rural area having a relatively low density of broadcast stations, the noise floor 412 is relatively low as is the desired signal 414. In accordance with an embodiment of the system and method for station detection and seek, the RSSI threshold, 416, is set sufficiently low to allow detection of weak stations in rural areas, such as the desired signal 414. The RSSI threshold signal is set to a level lower than a level of the lowest anticipated desired signal. On the other hand, the noise floor 422 in the metropolitan area is significantly higher than the noise floor 412 in the rural area. In some instances, the noise floor 422 in the metro area can be higher than the RSSI threshold 416. As a result, invalid channels, such as channel 428 in the metro area will pass the RSSI threshold test. However, the SACPR of the invalid channel 428 is approximately 0 db, which is substantially lower than a predetermined threshold $\gamma\_sacpr$ of 10 db, in this example. Thus, an invalid channel 428 will be eliminated when the SACPR signal is compared to the SACPR threshold.

The situation described in FIG. 1B can also be addressed using the system and method for station detection and seek in a radio receiver. Referring to FIG. 1B, the power spillover from valid channel N into its adjacent channels N−1 and N+1 can exceed the RSSI threshold. Thus, invalid channels N−1 and N+1 can pass the RSSI test. However, the SACPR measured in channels N−1 and N+1 will be less than 0 db, and much less than the threshold $\gamma\_sacpr$. Thus, channels N−1 and N+1 will be eliminated when the SACPR signal is compared to the SACPR threshold.

Figure 5:
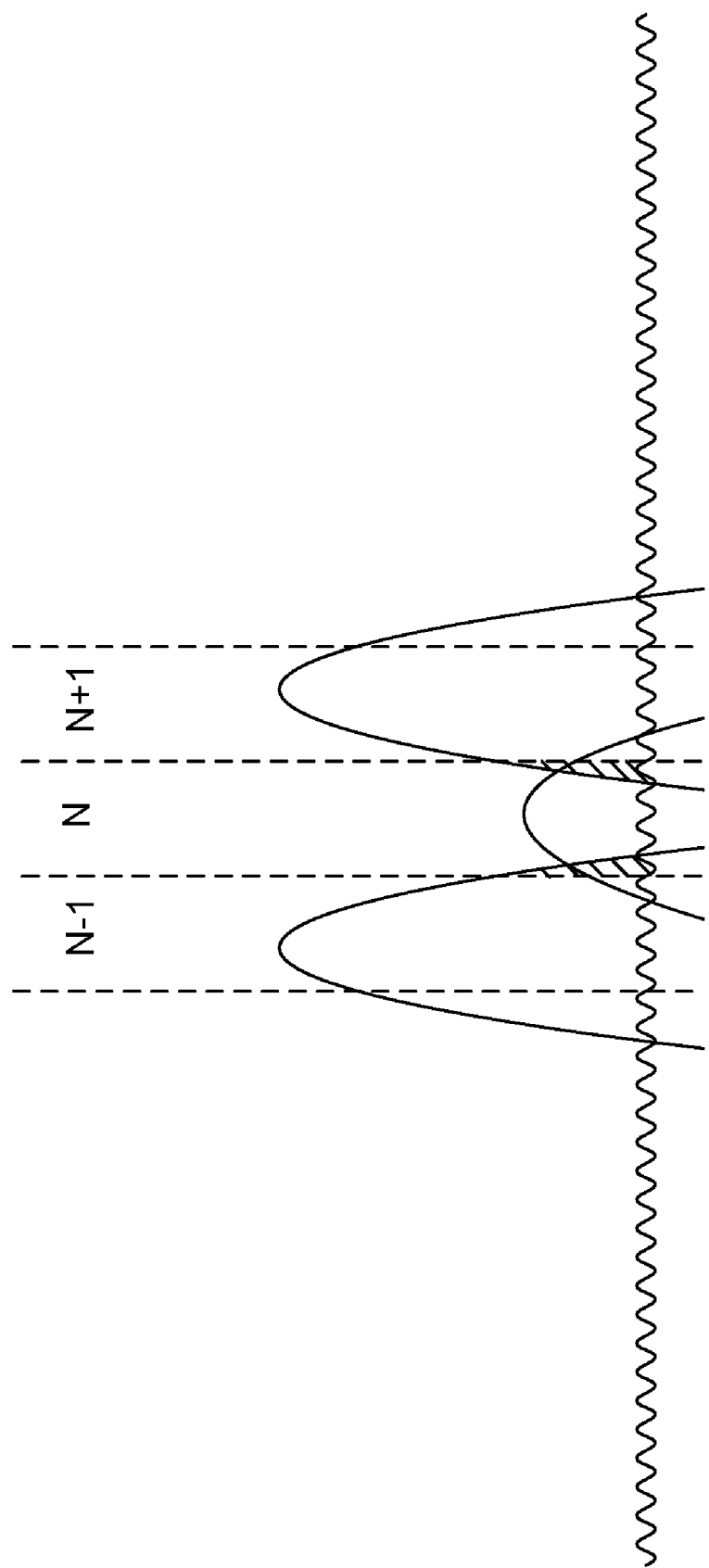
FIG. 5 is a schematic diagram illustrating a situation in which valid stations exist in adjacent channels N−1, N, and N+1.

FIG. 5 is a block diagram illustrating a situation in which valid stations exist in adjacent channels N−1, N, and N+1. If the station power in channel N is weaker than the power in its adjacent channels, as depicted in FIG. 5, then the channel N will fail the SACPR test, and will not be detected as a valid channel.

While the SACPR test can have an adverse effect in the situation depicted in FIG. 5, in practice, however; such a situation is very uncommon. In the field of FM radio broadcast, frequency planning is typically performed to ensure that valid channels are sufficiently spaced apart by at least one empty channel. In the rare case where the situation described in FIG. 5 does exist, it is generally acceptable that the radio only seek to the stronger station of the adjacent channels, i.e., channels N−1 and N+1 in FIG. 5. In addition, the user can manually tune to the weaker station if they desire to do so.

In such a case, the reception quality of the weak channel usually suffers from the energy spillover from the strong adjacent channels. To mitigate the degradation of reception quality, it is desirable to reduce the bandwidth of the switchable bandwidth channel select filter 710 to reduce the power spillover that passes through the switchable bandwidth channel select filter 710. In this embodiment, the switchable bandwidth channel select filter 710 is structured in such a way that it not only readily measures the SACPR, but also performs dynamic bandwidth control. The dynamic bandwidth control greatly improves selectivity by switching to a smaller bandwidth when the ratio of power in the adjacent channel(s) to the power in the desired channel exceeds a threshold. The details of channel select filter 710 and the method of dynamic bandwidth control will be described in more detail below.

Figure 6:
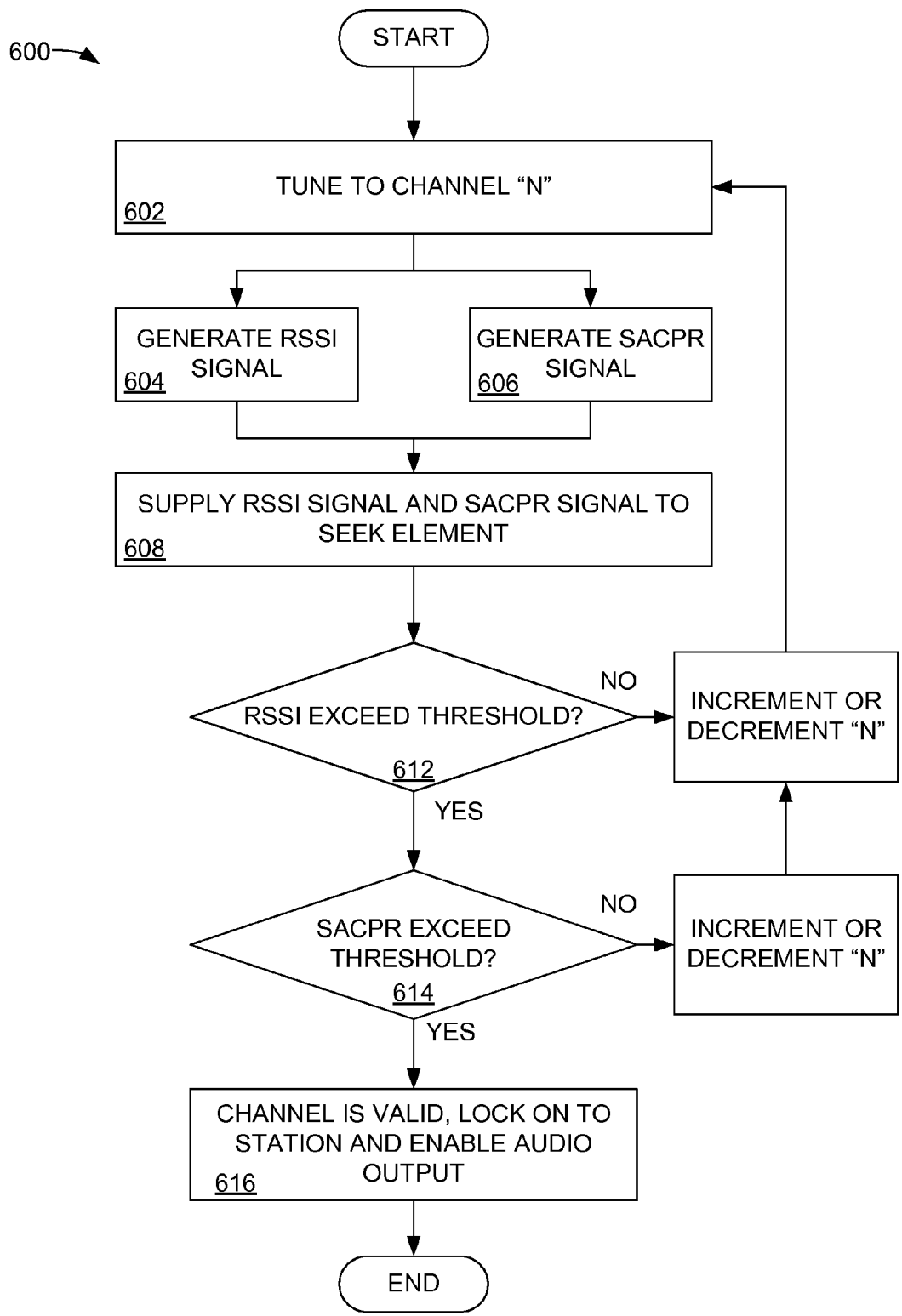
FIG. 6 is a flow chart describing the operation of an embodiment of the seek element of FIG. 3.

FIG. 6 is a flow chart 600 describing the operation of an embodiment of the seek element 550 of FIG. 3. The blocks in the flowchart can be performed in or out of the order shown by the elements described above, or can be performed by different elements. In this example, the search of valid channels starts with channel number N. In block 602, the radio 300 is first tuned to channel N. The RSSI signal and the SACPR signal are generated in blocks 604 and 606, respectively. The RSSI signal and the SACPR signal can be generated simultaneously or sequentially. In block 608, the RSSI signal and the SACPR signals are provided to the seek element 550. In block 612, the seek element 550 determines whether the RSSI signal exceeds an RSSI threshold. If the RSSI signal does not exceed the threshold, the channel is declared invalid and skipped. If the RSSI signal does not exceed the threshold and the channel is declared invalid and skipped, the channel number is updated by incrementing or decrementing by one (1), depending on whether the seek function is progressing up or down. The process then returns to block 602 where the next channel is obtained. If, in block 612 it is determined that the RSSI signal exceeds the threshold, then, in block 614, the seek element 550 determines whether the SACPR signal exceeds an SACPR threshold. If the SACPR signal does not exceed the SACPR threshold, then the channel is declared invalid and skipped. If the SACPR signal does not exceed the SACPR threshold and the channel is declared invalid and skipped, the channel number is incremented or decremented, as described above, and the process returns to block 602. If, it is determined in block 614 that the SACPR signal exceeds the SACPR threshold, then, the channel is declared valid, and in block 616, the seek element 550 locks the station, and the audio output is enabled.

The seek operation described above uses a measurement of the SACPR value. In accordance with an embodiment of the system and method for station detection and seek in a radio receiver is the simple and reliable measurement of SACPR. In this embodiment, the switchable bandwidth channel select filter 710 is structured in such a way that it not only readily measures the SACPR, but also provides superior selectivity and dynamic bandwidth control. The system and method for station detection and seek in a radio receiver is fully integrated into a radio receiver and does not use additional circuit area. Further, the system and method for station detection and seek in a radio receiver is particularly well suited for digital filter implementation.

Figure 7:
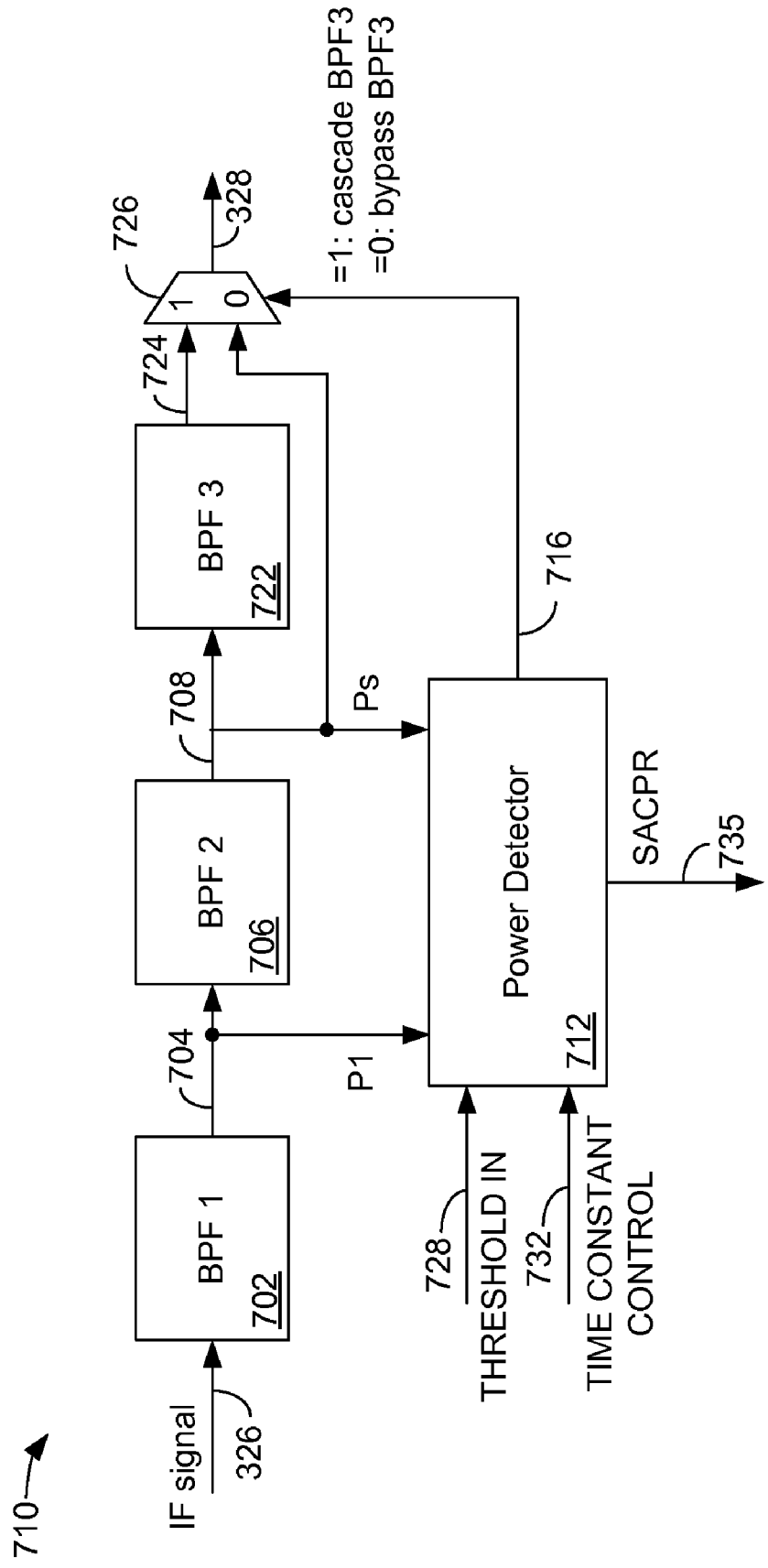
FIG. 7 is a schematic diagram illustrating an embodiment of the switchable bandwidth channel select filter of FIG. 3.

FIG. 7 is a schematic diagram illustrating an embodiment of the switchable bandwidth channel select filter of FIG. 3. The switchable bandwidth channel select filter 710 includes a first bandpass filter 702, a second bandpass filter 706 and a third bandpass filter 722. The switchable bandwidth channel select filter 710 also includes a power detector 712 and a multiplexer (MUX) 726. However, the power detector 712 and the MUX 726 may be implemented separate from the bandpass filters 702, 706 and 722. The power detector 712 measures the power on connection 704 and connection 708 and determines the value of the SACPR signal. The power detector 712 provides the measured SACPR signal on connection 735, as described above.

Figure 8:
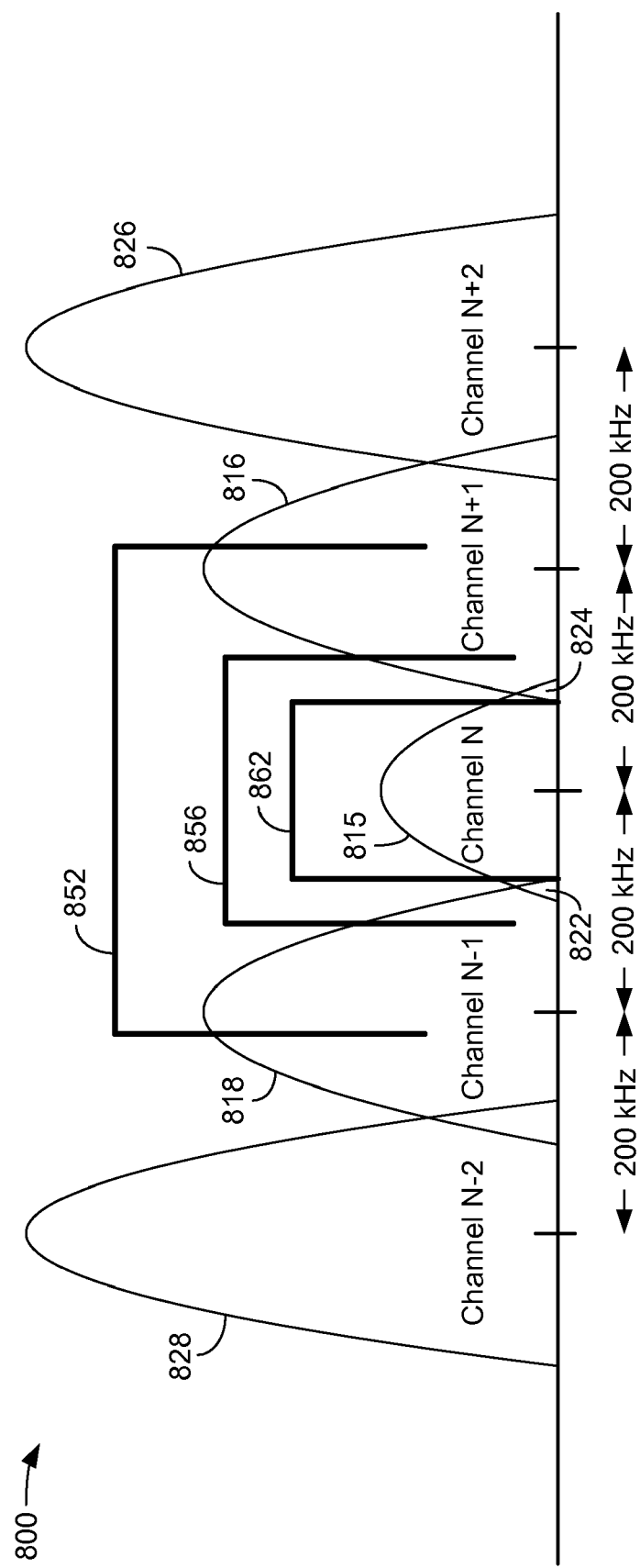
FIG. 8 is a schematic diagram illustrating the bandwidth of each bandpass filter of FIG. 7, relative to the channel spacing.

FIG. 8 is a schematic diagram illustrating the bandwidth of each bandpass filter of FIG. 7, relative to the channel spacing, which in this example is nominally 200 kHz. In FIG. 8, the power spectrum of the input IF signal includes the desired signal in channel 815 (channel N), two adjacent channel interfering signals in channels 816 and 818 (channels N+1 and N−1, respectively), and two alternate channel interfering signals in channels 826 and 828 (channels N+2 and N−2, respectively). The frequency responses of the bandpass filters 702, 706 and 722 are shown using traces 852, 856 and 862, respectively. The amplitudes of these frequency response curves are arbitrary and not to scale. The bandwidth of the first bandpass filter 702 (BPF 1, trace 852) is about two (2) times the channel bandwidth, or spacing, which is nominally 200 kHz in this example. The bandwidth of the second bandpass filter 706 (BPF 2, trace 856) is about equal to the channel bandwidth, or spacing. The bandwidth of the third bandpass filter 722 (BPF 3, trace 862) is set lower than one channel bandwidth, so that any spillover from the adjacent channel interfering signals into the desired channel can be significantly removed. As shown in FIG. 8, the bandpass filter 722 (trace 862) removes any spillover in the regions 822 and 824 while leaving a significant amount of desired signal energy in the channel 815.

Referring again to FIG. 7, the intermediate frequency FM input signal on connection 326 is supplied to the first bandpass filter 702. The first bandpass filter 702 filters the FM input signal on connection 326 to remove all but the power in the desired channel and a portion of the power in the adjacent channels. In this example, the first bandpass filter 702 removes approximately one half of the power in the adjacent channels, but this need not be the case. The characteristics of the bandpass filters can be designed based on a desired implementation. The output of the bandpass filter 702 on connection 704 represents the desired signal and approximately one half of the power of the channels that are adjacent to the desired signal.

The output of the first bandpass filter 702 is supplied via connection 704 to the second bandpass filter 706. The second bandpass filter 706, having a bandwidth equaling approximately one channel bandwidth in this example, filters the signal on connection 704 to remove the adjacent channel signal energy. However, it does not remove the spillover energy that is inside the desired signal channel 815 (FIG. 8) and shown in regions 822 and 824 of FIG. 8. Therefore, the output of the second bandpass filter 706 on connection 708 represents the desired signal and the spillover of the adjacent channel interfering signals into the desired channel 815 (FIG. 8).

The output of the first bandpass filter 702 on connection 704 and the output of the second bandpass filter 706 are also supplied to the power detector 712. The power on connection 704 is referred to as P1 and the power on connection 708 is referred to as Ps. The power detector measures P1 and Ps, and calculates the difference of P1−Ps. The difference, P1−Ps, represents one half of the sum of the power present in the left and right adjacent channels (816 and 818 of FIG. 8). Stated another way, P1−Ps represents the average adjacent channel power. Thus, the power detector 712 can determine whether there is power present in the adjacent channels, and if so, the level of the average adjacent channel power.

The power detector 712 also calculates the ratio of Ps to P1−Ps, or Ps/(P1−Ps). This ratio represents the desired signal to adjacent channel power ratio, or SACPR. A small value of SACPR indicates large adjacent channel interference relative to the desired signal, which, in turn, suggests the power spillover from adjacent channels to the desired channel is a significant portion of the desired signal. Under such a condition, additional filtering is desired. The power detector compares SACPR to a predetermined threshold, $\gamma\_bw$ (where the term bw refers to bandwidth). If the value of SACPR is less than the $\gamma\_bw$, then the channel select filter 710 is switched to a narrow bandwidth mode to apply additional filtering. The implementation of the bandwidth switching is described in more detail below.

It should be noted that the threshold for bandwidth switching, $\gamma\_bw$ is different from the SACPR threshold used for valid station detection, $\gamma\_sacpr$. The threshold $\gamma\_bw$ is normally set less than or equal to 0 db, whereas the threshold $\gamma\_sacpr$ is normally set greater than 0 db.

The optimal value for the threshold $\gamma\_bw$ can be determined based on system requirements, on the amount of adjacent channel interference that the system can tolerate, or on desired signal strength. If the system can tolerate more adjacent channel interference, then $\gamma\_bw$ can be set at a smaller value, and vice versa.

The output of the second bandpass filter 706 is supplied over connection 708 either to a third bandpass filter 722 or to a multiplexer 726. If the power detector 712 determines that signal power is sufficiently smaller than the power in the adjacent channels, (for example, if (SACPR<$\gamma\_bw$)) then the power detector 712 provides a logic high signal via connection 716 to the multiplexer 726. If the power detector 712 determines that the signal power is sufficiently greater than the power in the adjacent channels, (i.e., if (SACPR>$\gamma\_bw$)) then the power detector 712 provides a logic low signal via connection 716 to the multiplexer 726.

A logic high signal supplied to the multiplexer 726 causes the multiplexer 726 to choose the output of the third bandpass filter 722 on connection 724. This mode is referred to as the narrow bandwidth mode. Stated another way, the third bandpass filter 722 is switched in only when the power ratio of desired channel to adjacent channel is less than $\gamma\_bw$. The bandwidth of the third bandpass filter 722 is less than a channel bandwidth, therefore it can remove the spillover power from the adjacent channel interfering signal or signals.

A logic low signal on connection 716 causes the multiplexer 726 to select the output of the second bandpass filter 706 on connection 708 and bypass the third bandpass filter 722. This mode is referred to as the nominal bandwidth mode. In this mode, the third bandpass filter 722 is bypassed. In this manner, the third, and significantly narrower, bandpass filter 722 is implemented only if there is sufficient energy present in the channels adjacent to the channel in which the desired signal is located.

The power detector 712 and the dynamic bandwidth switching of the switchable bandwidth channel select filter 710 operate with a time constant control supplied via connection 732. The time constant control sets the minimum time duration between two bandwidth switching events. The optimal value for the minimum time duration depends on system requirements and can be pre-determined based on system specifications.

It is often desirable to add hysterisis to the dynamic bandwidth switching. Adding hysterisis prevents the bandwidth switching from "chattering" when the difference between SACPR and $\gamma\_bw$ is small. "Chattering" is often undesirable as it adds noise. One way of adding hysterisis is to use a larger value of $\gamma\_bw$ for switching from narrow bandwidth mode to nominal bandwidth mode, and a smaller value of $\gamma\_bw$ for switching from nominal bandwidth mode to narrow bandwidth mode.

It should be noted that the dynamic bandwidth control is enabled only when the radio is already locked on to a station. The dynamic bandwidth control is disabled during seek. The channel select filter is fixed in the normal bandwidth mode during seek, so that the SACPR can be accurately measured.

In an embodiment, and using the FM radio spectrum with 200 kHz channel spacing as an example, the first bandpass filter 702 is a 6th order infinite impulse response (IIR) filter having a bandwidth of approximately 400 kHz. The second bandpass filter 706 is a finite impulse response (FIR) filter having 17 taps and a bandwidth of approximately 180 kHz. The third bandpass filter 722 is also a finite impulse response (FIR) filter having 17 taps and a bandwidth of approximately 90 kHz. The approximate 400 kHz bandwidth of the first bandpass filter 702 represents approximately two channel bandwidths in this example. The 180 kHz bandwidth of the second bandpass filter 706 represents approximately one channel bandwidth in this example. The bandwidth of the third bandpass filter 722 is approximately 90 kHz and is narrower than one channel bandwidth in this example.

Cascading the third bandpass filter 722 results in a switchable bandwidth channel select filter 710 having a very narrow bandwidth and improves rejection of adjacent channel interference. However if the ratio of the power output of the first bandpass filter 702 to the output of the second bandpass filter 706 is lower than the threshold, then the third bandpass filter 722 is bypassed, resulting in an overall nominal filter bandwidth that includes the cascaded first and second bandpass filters 702 and 706. This allows the FM radio to operate in stereo mode with low distortion and good stereo channel separation when there is little or no adjacent channel interference. The filter bandwidth switching operates with a time constant and hysteresis control. In addition to the capability of detecting adjacent channel interference, the switchable bandwidth channel select filter 710 achieves superior overall filter performance without an increase in an area because the bandpass filters 702, 706 and 722 are connected in series and can be independently and separately optimized.

The adjacent channel interference detection provided by the power detector 712 does not interrupt the normal operation of the FM radio. Power located in a channel adjacent to the desired channel is measured in real-time, regardless of whether the bandwidth of the switchable bandwidth channel select filter is in the narrow (all filters cascaded) or the nominal setting (bandpass filters 702 and 706 cascaded). In addition, adjacent channel power is measured before the FM signal is demodulated. Accordingly, adjacent channel power can be measured reliably and accurately.

Furthermore, the cascaded bandpass filter structure not only allows measurement of adjacent channel interference, but also allows implementation of desirable filter characteristics at a low cost. Because the bandpass filters are connected in series, they all contribute to the frequency response of the overall switchable bandwidth channel select filter 710. Therefore, sophisticated filter characteristics can be achieved with relatively simple filters. Because each filter can be optimized separately, the switchable bandwidth channel select filter 710 can achieve high overall filter performance given a particular die area. While three bandpass filters are described, a different number of bandpass filters can be implemented, depending on desired system performance and other factors.

While various embodiments of the invention have been described, it will be apparent to those of ordinary skill in the art that many more embodiments and implementations are possible that are within the scope of the invention. For example, the invention is not limited to a specific type of bandpass filter. For example, the bandpass filters can be digital or analog filters, real or complex filters, finite impulse response (FIR) or infinite impulse response (IIR) filters. Embodiments of the invention are applicable to different sections of a radio system, for example, the radio-frequency section, the intermediate-frequency section, or the baseband section. Embodiments of the invention are not limited to an RF system. Embodiments of the invention are applicable to other communication systems, where it is desirable to implement a robust channel detection and seek function.

What is claimed is:

1. A system for detecting a broadcast channel in a radio receiver, comprising:
    a receive signal strength indicator (RSSI) element configured to develop an RSSI signal that is representative of a power in a desired channel;
    a switchable bandwidth channel select filter having a power detector configured to compare a power output of the desired channel and at least one channel adjacent to the desired channel to develop a signal to adjacent channel power ratio (SACPR) signal that is representative of the noise in the desired channel, the switchable bandwidth channel select filter including logic configured to determine an amount of noise in the at least one channel adjacent to the desired channel; and
    a seek element configured to determine whether the RSSI signal is greater than a predetermined RSSI threshold and configured to determine whether the SACPR signal is greater than a predetermined SACPR threshold.

2. The system of claim 1, in which the RSSI threshold signal is set to a level lower than a level of a lowest anticipated desired signal.

3. The system of claim 2, in which the desired channel is indicated as valid when the SACPR signal exceeds the predetermined SACPR threshold.

4. The system of claim 1, in which the amount of noise in the channel adjacent to the desired channel indicates an amount of noise in the desired channel.

5. The system of claim 1, in which the power detector determines a ratio of the power in the desired channel to the power in the channel adjacent to the desired channel.

6. A portable transceiver having a system for detecting and minimizing interference, comprising:
    a transmitter operatively coupled to a receiver;
    an FM radio receiver comprising:
        a receive signal strength indicator (RSSI) element configured to develop an RSSI signal that is representative of a power in a desired channel;
        a switchable bandwidth channel select filter having a power detector configured to compare a power output of the desired channel and at least one channel adjacent to the desired channel to develop a signal to adjacent channel power ratio (SACPR) signal that is representative of the noise in the desired channel, the switchable bandwidth channel select filter including logic configured to determine an amount of noise in the at least one channel adjacent to the desired channel; and
        a seek element configured to determine whether the RSSI signal is greater than a predetermined RSSI threshold and configured to determine whether the SACPR signal is greater than a predetermined SACPR threshold.

7. The transceiver of claim 6, in which the RSSI threshold signal is set to a level lower than a level of a lowest anticipated desired signal.

8. The transceiver of claim 7, in which the desired channel is indicated as valid when the SACPR signal exceeds the predetermined SACPR threshold.

9. The transceiver of claim 6, in which the amount of noise in the channel adjacent to the desired channel indicates an amount of noise in the desired channel.

10. The transceiver of claim 6, in which the power detector determines a ratio of the power in the desired channel to the power in the channel adjacent to the desired channel.

11. A method for detecting a broadcast channel in a radio receiver, comprising:
    developing an RSSI signal that is representative of a power in a desired channel;
    comparing a power output of the desired channel and at least one channel adjacent to the desired channel to develop a signal to adjacent channel power ratio (SACPR) signal that is representative of the noise in the desired channel;
    determining an amount of noise in the at least one channel adjacent to the desired channel;
    determining whether the RSSI signal is greater than a predetermined RSSI threshold and determining whether the SACPR signal is greater than a predetermined SACPR threshold; and
    locking on the desired channel if the RSSI signal is greater than the predetermined RSSI threshold if the SACPR signal is greater than the predetermined SACPR threshold.

12. The method of claim 11, further comprising setting the RSSI threshold signal to a level lower than a level of a lowest anticipated desired signal.

13. The method of claim 12, further comprising indicating the desired channel as valid when the SACPR signal exceeds the SACPR predetermined threshold.

14. The method of claim 11, in which the amount of noise in the channel adjacent to the desired channel indicates an amount of noise in the desired channel.

15. The method of claim 11, further comprising determining a ratio of the power in the desired channel to the power in the channel adjacent to the desired channel.

* * * * *